United States Patent [19]

Luboshez

[11] 4,035,539

[45] July 12, 1977

[54] STRUCTURAL PANEL

[76] Inventor: Sergius N. Ferris Luboshez, 3530 Pinetree Terrace, Falls Church, Va. 22041

[21] Appl. No.: 685,520

[22] Filed: May 12, 1976

[51] Int. Cl.² .................. B32B 3/12; B32B 3/28
[52] U.S. Cl. .................. 428/178; 52/616; 52/618; 350/160 R; 350/164; 350/259; 350/264; 428/182; 428/913
[58] Field of Search ........... 428/181, 182, 46, 186, 428/203, 178, 461, 184, 913; 350/263, 264, 160 R, 164, 259; 264/282; 52/616, 618

[56] References Cited

U.S. PATENT DOCUMENTS

| | | | |
|---|---|---|---|
| 2,543,251 | 2/1951 | Muench | 427/200 |
| 3,059,537 | 10/1962 | Wälli | 350/263 |
| 3,443,860 | 5/1969 | Luboshez | 350/263 |
| 3,453,039 | 7/1969 | Osborne | 350/263 |
| 3,642,557 | 2/1972 | Warp | 350/263 |
| 3,684,352 | 8/1972 | Luboshez | 350/263 |

FOREIGN PATENT DOCUMENTS

| | | | |
|---|---|---|---|
| 471,003 | 1969 | Switzerland | 428/186 |

*Primary Examiner*—Marion E. McCamish
*Assistant Examiner*—P. J. Thibodeau
*Attorney, Agent, or Firm*—John Harrow Leonard

[57] ABSTRACT

A panel of spaced, parallel, translucent, outer sheets of set plastic material with an inner sheet of corrugated sheet plastic disposed therebetween with the crests of the corrugations at the opposite faces of the corrugated sheet being engaged with, and secured in fixed relation to, adjacent outer sheets, respectively. Each corrugation has alternate show areas and shade areas. The show areas are coated with material which reflects light or impedes the passage of light therethrough. The shade areas are generally uncoated so that, relative to the show areas, their reflectivity is less and their light transmission is greater. The corrugations are so related to the outer sheets that, in the panel cross section, they define with the outer sheets right angle triangles with one side of each corrugation at a right angle to both outer sheets. The resultant panel is thus a truss structure, having high strength, desirable controlled light transmitting characteristics, and high heat insulating properties.

16 Claims, 8 Drawing Figures

STRUCTURAL PANEL

BACKGROUND OF INVENTION

1. Field of Invention

Prefabricated structural panels for buildings.

2. Description of Prior Art

Currently buildings are constructed on site from many diverse parts which may be prefabricated or fabricated at the worksite. Basically such parts include the framing structure, roof, walls, floors, doors, and windows. These are supplemented by such auxiliaries as thermal insulation of walls, roof, and floor, and by shading devices for windows, such as exterior awnings or interior drapes and curtains. All of these various parts are made from different materials and fabricated by different methods, and each is installed in a special manner as dictated by its own peculiar properties and construction.

The widely diverse functions to be performed by these parts has led to lack of unity in the building structure, of coordination in function, and of consistency in the materials used, and methods employed in construction.

SUMMARY

The present invention is directed to prefabricated structural panels or units which can be used throughout the building in various fashions, thereby reducing the need for many various diverse parts heretofore necessary. Due to their load bearing capacity, they are useful for constructing walls, roofs, and floors, thus eliminating a large amount of the framing heretofore necessary.

Specifically, the panels are highly reflective of direct sunrays while transmitting the diffused light, thus rendering them useful as windows, and eliminating the need for awnings, shades, and drapes. They have thermal insulation qualities thus dispensing with the need for intra-wall heat insulating materials and thermopanes in windows. They have a high load bearing capacity in relation to the strength, due to the truss structure incorporated in their design. The units or panels have a high resistance to vandalism and accidental breakage. There are no basic technical differences between the panels used for windows, doors, roof structures, floors and walls. The wall made thereof, or any selected portion thereof, can function as a window.

By simple adaptations, the basic panels or structural units are suitable for all exposures and are functional for efficiency in heating, cooling, and lighting of the building throughout a wide range of latitudes, from arctic to tropical, and of buildings orientations. They lend themselves to manufacture of modular units of selected load bearing capacities, in relation to their strength, as may be required for particular buildings. They supplant much of the conventional framing structure. They can be cut to fit at the worksite by conventional saws, whenever necessary. They can be incorporated in the building by the average workman or carpenter without the need for highly specialized tools and equipment.

Various other objects and advantages of the invention will become apparent from the following description wherein reference is made to the drawings.

Figure 1:
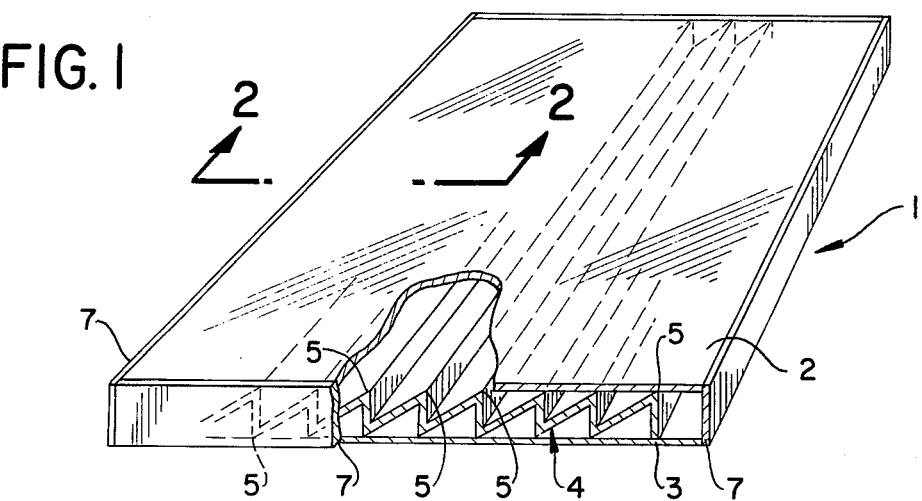
FIG. 1 is a perspective view of a panel embodying the principles of the present invention, parts thereof being broken away for exposing the interior.
Figure 2:
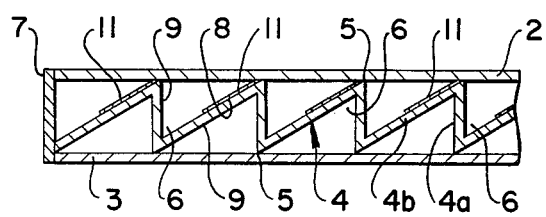
FIG. 2 is an enlarged fragmentary vertical cross sectional view of the panel, and is taken on the line 2—2 in FIG. 1.

Referring generally to FIGS. 1 and 2, the unit or panel, indicated generally at 1, comprises planar parallel sheets 2 and 3 of set plastic material which are spaced from each other flatwise with a specialized reinforcing corrugated sheet 4 therebetween. The panel may comprise a stack of alternate sheets 2 and reinforcing sheets 4, to any number desired, but generally two sheets 2 with a single reinforcing sheet therebetween is satisfactory. Further, while the sheets 2 are shown as planar, which is usually desired, they may be curvilinear, and parallel to each other.

In the form illustrated, the sheet 4 is corrugated preferably so as to have a row of parallel like corrugations having angularly disposed planar alternate portions 4a and 4b, defining peaks, such as indicated at 5, at opposite faces with valleys or troughs 6 therebetween, the base of each valley 6 being at one of the sheets 2 and 3 and its open side being at the opposite one of the sheets 2 and 3. Preferably, the corrugations form with the sheets 2 and 3 triangular cross sections, as illustrated in FIGS. 1 and 2. The sheets are corrugated by pleating the flat sheet material as disclosed in my U.S. Pat. No. 3,349,159, issued Oct. 24, 1967.

The sheet 2 is juxtaposed against the peaks 5 of the corrugations at one face of the corrugated sheet 4 and the sheet 3 is juxtaposed against the peaks 5 of the corrugations at the opposite face of the sheet 4. The peaks 5 of the corrugations preferably are held in fixed position relative to their associated ones of the sheets 2 and 3 in the direction of the row of corrugations. Preferably this is done by bonding or cementing each peak, either along its entire length or at selected spots or locations along its entire length, to the adjacent face of the associated one of the sheets 2 and 3.

Thus the cross section of the panel, as illustrated in FIG. 2, is in the form of a truss beam having upper and lower tension and compression plates or sheets 2 and 3, respectively, with truss elements, provided by the sheet 4, therebetween.

Here it is to be noted that in the final panel, the valleys 6 of the corrugations are closed at their open faces along their entire lengths by a common one of the plates 2 or 3 toward which the valleys open. Accordingly, each corrugation combined with the one of the sheets 2 and 3 closing the open side at the peaks 5 opposite the base of its valley, defines an air space which is isolated from the air spaces similarly formed by the other corrugations. These air spaces greatly reduce, in fact, practically eliminate, convection of heat in the direction of the row of corrugations, and conduction of heat through the resultant panel from the outer face of the sheet 2 to the outer face of the sheet 3. As a result, the panel 1 has high thermal insulating properties. For like reasons, the panel has good sound insulation properties.

In order to enhance these properties and further strengthen the panel, the panel may be sealed peripherally by a peripheral sealing strip 7 which extends around the entire peripheral edge of the panel. The peripheral sealing strip 7 is preferably of the same material as the sheets 2 and 3 and is fastened thereto by cementing or bonding it to the edges of the sheets 2 and 3 and to the adjacent contacting end portions of the corrugated sheet 4. If desired, the peripheries may be sealed by applying thereto a flowable air-setting cement which, if applied as a thick ribbon or layer and allowed to set, forms a relatively strong sealing peripheral wall.

For most purposes sheets 2 and 3 are transparent or translucent, and the sheet 4 and peripheral wall likewise may be the same. While generally they are of set synthetic plastic, for some purposes they may be of glass.

Figure 6:
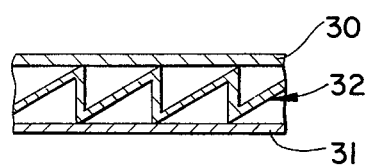
FIG. 6 is a sectional view similar to FIG. 2, showing the incorporation of different type of light reflective corrugated reinforcing spacer.

The sheet 4 preferably has various areas coated with reflective material, such as the light reflective or radiation reflective material described particularly in FIG. 6 of my U.S. Pat. No. 3,443,860, issued May 13, 1969. As therein more fully described, the corrugated sheet has show areas coated with light reflecting material, as indicated at 8, and underlay or shade areas, such as indicated at 9, which are uncoated, or are less, reflective and are shaded by the show areas, so that light can be transmitted therethrough to preselected degrees. These show areas are arranged so that when one face of the panel, for instance the face that forms the face 2, is disposed in a predetermined relation to a source of radiation, such as sunlight, the coated areas are in proper position to reflect the direct rays of the sunlight, while the shade or underlay areas 9 are shaded by the coated show areas. Hence the direct rays of the sun do not impinge on the shade areas, but the diffused light created by the source can pass therethrough to the interior of the building structure. For example, the panel may be disposed upright with the sheet 2 outwardly, the corrugations horizontal, and the coated show areas sloping back away from the sheet 2 toward the inside of the building in a direction from bottom to top of the panel.

Though the corrugations may take various forms and shapes, they preferably are such that when the sheet 4 is bonded in place between the sheet 2 and 3, the corrugations form with the sheets cross sections which are right angle triangles of which the acute angles are 30° and, 60°, respectively. Preferably they are disposed so that the shorter planar portion 4a of each corrugation is at substantially 90° to the parallel sheets 2 and 3 and forms the short side of the triangle. One of the sheets 2 and 3, at the open side of the valley 6 of the associated corrugation, forms the long side of the triangle, and the longer planar portion 4b of the corrugation forms the hypotenuse of the triangle. The hypotenuse slopes at an acute angle to the sheets 2 and 3. This 90° arrangement of the planar portion 4a is desirable because any load bearing directly downwardly on the face of the sheet 2 in FIG. 2 and trnsmitted through the portion 4a does not create any appreciable resultant components of force parallel to the sheets 2 and 3, as they would were the portion 4a at an acute angle to the sheets 2 and 3. Thus the panel is constructed to take advantage of the fact that the strength of a beam is proportional to the width times the square of the depth. Accordingly, with this structure very high strength can be developed with relatively thin sheets.

The overall depth of the panel may vary from a small fraction of an inch to several inches. The thickness of the sheets 2 and 3, respectively, may vary from a relatively small fraction of an inch to a much larger fraction of an inch, depending upon the load to be sustained and their spacing from each other. The spacing may vary from a fraction of an inch to several inches. All of these dimensions are dependent upon the use to which the panel is to be put, and, specifically, the size and nature of the load to be borne; for example, whether dead load, wind load, or impact shock load, from the outside or inside, delivered against the face of the panel. Again, when used in walls, the panel may be made light for partitioning only, or heavy for a load bearing wall.

If desired, the sheet 4 may be coated, as illustrated in FIGS. 1 and 2, or coating may be differently disposed. For example, the reflective or metallic coating may be applied to one face portion of the hypotenuse of the corrugation, as indicated at 11 on the front face thereof facing toward the sheet 2.

Figure 3:
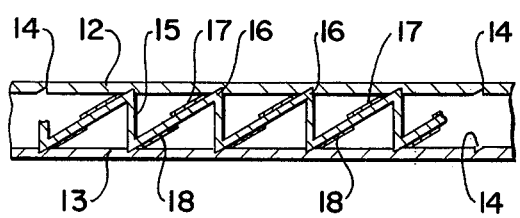
FIG. 3 is a view similar to FIG. 2, illustrating a modified manner of securing portions of the panel together.

Instead of cementing or bonding the external crests 5 of the corrugations to the sheets 2 and 3, the modified structure which is illustrated in FIG. 3 may be employed. In this structure the sheets 12 and 13, corresponding to the sheets 2 and 3, are employed. These sheets are provided with inside grooves or notches 14 which extend parallel to each other and open at the inner face of their associated sheet toward the opposite sheet. The corrugated spacing sheet 15 is disposed between the sheets 12 and 13 with its external crests, indicated at 16, engaged in the grooves or notches 14. The crests may be bonded in the grooves, if desired. The structure in other respects may be the same as the structure illustrated in FIGS. 1 and 2.

The notches prevent migration of the crests relative to the associated sheets 12 and 13, thus assuring a rigid load bearing structure.

Here again the reflective coating may be applied to the sheet 15. For example, it may be applied to the hypotenuse of the triangle, part to the outer face thereof, as indicated at 17 and part to the remainder of the hypotenuse at the opposite face of the hypotenuse facing the sheet 13, as indicated at 18. Such a corrugation and coating is disclosed generally in FIG. 3 of my U.S. Pat. No. 3,443,860, above noted.

Figure 4:
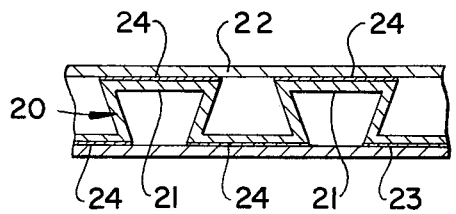
FIG. 4 is a sectional view similar to FIG. 2 showing a modified form of corrugated reinforcing spacer used in the panel, and showing one manner of coating the corrugated member for modifying its light transmitting properties.

Again, instead of the specific corrugations shown in FIGS. 2 and 3, a modified corrugated sheet 20, as illustrated in FIG. 4, may be employed, as disclosed in FIG. 10 of my last identified patent. In this form the corrugations are generally trapezoidal, having what might be termed wide flat external crests, as indicated at 21, instead of the narrow or sharp peaks indicated at 5 in FIGS. 1 and 2. Instead of being trapezoidal, the sides of the corrugations may be at right angles to the crest portion.

The sheet 20 may be securely fastened between sheets 22 and 23 to provide a truss structure. The crests 21 may be coated with light reflective films, as indicated at 24, for like advantages.

Figure 5:
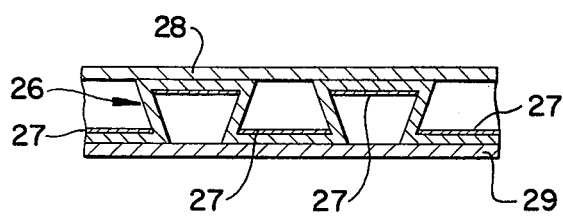
FIG. 5 is a view similar to FIG. 4 showing a different disposition of the coating material on a like structure.

In FIG. 5 a structure similar to that of FIG. 4 is illustrated, in which the corrugated sheet 26, corresponding to sheet 20, is employed. The structure differs from that of FIG. 4 only in the fact that the coating, indicated at 27, is on the inner faces of the crests of the corrugations so that it does not interfere with the bonding of the crests of the corrugations to the facing sheets indicated at 28 and 29, respectively.

In FIG. 6, a panel which in all respects is the same as that shown in FIGS. 1 and 2, except for the characteristics of the corrugated sheet, is disclosed. In this form, the facing sheets 30 and 31 may be transparent or translucent and the corrugated sheet 32 made of radiochromic material, as described in my U.S. Pat. No. 3,684,352, issued Aug. 15, 1972. This panel has particular advantages in that no matter in which manner it is faced to any given source of light, parts of it will receive the direct radiations from the source, and thereupon darken, thus becoming show areas which, when the parts directly exposed darken, shade other or shade areas, so that the latter remain light transmitting. Again, the entire panels of any one of the forms may normally be transparent or translucent.

Figure 7:
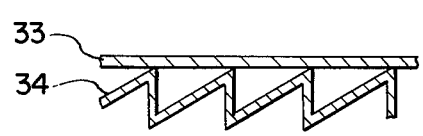
FIG. 7 is a fragmentary cross sectional view of a modified form of panel, using fewer parts, yet satisfactory for certain limited applications.

Referring next to FIG. 7, a modification of the panel illustrated in FIG. 1 is shown in section, this panel being generally the same as in FIG. 1 except that, instead of two facing sheets, only one face sheet is provided. This facing sheet 33, corresponding to the sheet 2, may be bonded or otherwise secured to the external peaks of the corrugations of the corrugated sheet 34. No sheet is fastened to the peaks opposite from those securd to the sheet 33. The sheet 34 may be of kodachromic material or coated at various locations as described hereinbefore. This structure has the advantage of being less expensive than the structures illustrated in the preceding figures. However, it has the disadvantage that it does not have the strength per unit weight that those above described have. There are many installations in which strength, however, is of secondary importance in which cases the structure of FIG. 7 can be used to advantage.

Figure 8:
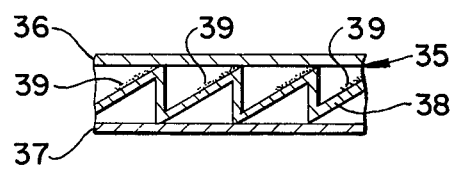
FIG. 8 is a view similar to FIG. 2 and showing another means for varying the light transmitting and reflective properties of the unit.

Another modification is shown in FIG. 8 which is desirable in those cases in which decorative effects are desired. In this form, the panel 35 employs facing sheets 36 and 37 spaced apart by a corrugated sheet 38 which is secured to the sheets at the crests of the corrugations. All or portions of the faces of these corrugations may be coated to a different degree by flocking. Preferably the flock areas, such as indicated at 39, correspond to the show areas heretofore described. Flocking may be chosen for mere surface texture or chosen for iridescence. It may be a continuous coating or it may be a coating effected by isolated flocking particles, or flocked areas interspersed with unflocked areas so as to permit some passage of light by the flocking material; for example, flocking material in the form of various types of prismatic particles, either transparent, translucent, or solid.

Thus the panels herein, insofar as light and heat reflecting and transmitting qualities are concerned, have the advantages of the structures illustrated in my above identified patents, yet a sheet configured to obtain these prior advantages lends itself admirably to incorporation into a trusslike structure which, while retaining these prior advantages, also has extreme rigidity in relation to the amount of material used. Not only does it provide a light reflecting transmitting property of preselected degrees, but also provides dead air spaces substantially coextensive with the entire wall of the building. Thus the panels can form walls of a building, doors, or windows, depending upon the particular use. The panels embodying the same principles, but varying in detail, can be used depending upon the characteristics desired in any particular location. In the roof they can be oriented so as to obtain the best or a controlled sky-lighting effect without undue entry of direct rays. Since the dead air spaces are substantially coextensive with the panels, a house constructed of the panels has external and partition walls and a roof having extremely high thermal and noise insulation qualities in and of themselves. The panels can be oriented depending upon the lighting effects desired. When disposed with the corrugations horizontally, they practically eliminate any convection currents from heat from the bottom of the panel or lower portion of the walls of the house toward the ceiling. It is apparent from the use of the corrugated sheet between the facing sheets, the resulting multiplicity of dead air spaces vastly increases the heat and noise insulating properties. Further advantages of using the two facing sheets is that the structure can be readily cleaned at both faces, whether inside or outside the house, because of the smooth planar surfaces of the facing sheets. The panels further lend themselves to an infinite variety of lighting effects which may be obtained by selecting the particular reflecting, refracting, translucent and opaque coatings applied to the corrugated sheet and by orienting the panels by rotating them about axes normal to, or extending lengthwise of, their flat faces. Thus, in one use, it may be desirable to face the panels with the corrugations extending vertically with the short sides of the corrugations facing toward the east or morning sun and the hypotenuse facing toward the west or midday sun, or vice versa.

Plastic material is preferred because of the fact that it has low heat conductivity, and is resistive to damage by accidental blows or vandalism, whereas glass is highly subject to destruction or damage under such forces. It has the advantage over double pane glass type of window in that the expansion and contraction is uniform throughout the panel, whereas when glass is used for windows and openings, the expansion and contraction is generally considerably different from that of the frame in which it is mounted, as a result of which the glass becomes loose and, in the case of double pane vacuum glasses, the vacuum is destroyed.

The present panels are of very light weight in relation to the strength and lend themselves well to use where glass is used in the present so-called "all glass" buildings.

An an example of one of the panels, the outer facing sheets 2 and 3 are translucent or transparent. Their thickness may vary from a small fraction of an inch to a much larger fraction, depending upon use. An example of a suitable panel is one in which the outer sheets are each 1/32 to ¼ inches thick; the corrugated spacing sheet preferably is of MYLAR or like plastic and the other sheets of more rigid plastic, such as PLEXIGLASS, LUCITE, LEXAN, etc. The short side of the corrugations range, for example, from ⅛ inch to several inches, the sheets 2 and 3 being spaced apart accordingly. The thickness of the corrugated sheet may range from 2 mills to 1/16 of an inch. As mentioned, the corrugations in cross section are preferably in the form of right angle triangles, with the short side of the triangular shape extending 90° to the facing sheets 1 and 2, so as to reduce force components parallel to the facing sheets 2 and 3, but, as mentioned, other shapes of corrugations and other sizes of triangles may be used.

As before stated, the panels reduce loss of heat in winter and reduce the introduction of heat from the outside in summer. In addition, rooms formed of these panels are well lighted by the natural outside light and the light that can pass from one room to another. At the same time, by employing two panels, juxtaposed face to face and oppositely facing or oriented in the same direction the observer in one room cannot view anything in the other adjacent room. Used as roof panels, they can provide an effect of a skylight, but oriented so that either a direct view of the sky is afforded or merely the diffused light from the sky. At the same time, they can be so oriented that direct intense rays of the summer sum cannot enter.

The panels can readily be connected together in the final structure either by mechanical connecting means or by bonding the edges and margins together. The panels, when made of the plastic as described, may be sawed for shaping into irregular shapes where required.

Having thus described my invention, I claim:

1. A structural unit comprising:
a first sheet of radiation transmitting material, at least part of which is translucent;
a second sheet of radiation transmitting material, at least part of which is translucent and part of which is radiation reflective;
said second sheet being corrugated to present at one face alternate corrugation crests and valleys with the bottoms of the valleys at each of its faces being the crests at the opposite of its faces;
said second sheet being disposed with said one face facing toward said first sheet and with said crests juxtaposed against said first sheet; and
a third sheet of radiation transmitting material, at least part of which is translucent, disposed with one face facing said opposite face of the second sheet and juxtaposed against the crests of the corrugations at said opposite face of the second sheet;
at least portions of said crests at said one face being fixedly bonded to said first sheet so as to form therewith a rigid trussed structure; and
at least portions of said crests of said opposite face of the second sheet being fixedly bonded to said third sheet so that the three sheets form a rigid trussed panel.

2. A structural unit according to claim 1 wherein said first and third sheets are smooth and planar.

3. A structural unit for buildings and comprising:
a pair of sheets of radiation transmitting material;
a corrugated spacer sheet of radiation transmitting material disposed therebetween and having at each face alternate corrugation crests and valleys, the crests at each face of the spacer sheet being at the bottoms of the valleys of the opposite face of the spacer sheet, and the crests at one face of the spacer sheet being juxtaposed against one sheet of said pair and the crests of the opposite face of the spacer sheet being juxtaposed against the other face of said pair;
the adjacent sides of each corrugation, in the cross section of the panel, defining with the sheet of said pair which engages its crests, substantially a right triangle with one side of the triangle being formed by said one sheet, and the other side and hypotenuse of the triangle being portions of the spacer sheet and extending from their intersection at said one sheet of said pair to the other sheet of said pair of sheets;
constraining means connecting the sheets together to form a panel.

4. The structural unit according to claim 3 wherein said constraining means are at at least portions of said crests, at at least one face of said spacer sheet, and are secured to the associated one of said pair of sheets so as to remain in fixed position relative thereto in directions transversely of the corrugations.

5. The structural unit according to claim 4 wherein said portions of the crests are bonded fixedly to the face of said associated one of said pair of sheets.

6. The structural unit according to claim 3 wherein at least portions of said corrugated spacer sheet are translucent, and other portions of the corrugated spacer sheet are opaque and light reflective.

7. The structural unit according to claim 3 wherein said right triangle is one of which the included angles are of different sizes from each other whereby the sides of the triangle are of different lengths, respectively, and the sheets are so disposed that the longer of the two sides of some of the triangles are formed by one sheet of said pair, and the longer of the two sides of the remainder of the triangles are formed by the other sheet of said pair.

8. The structural unit according to claim 7 wherein said included angles are about 30° to 60°, respectively.

9. The structural unit according to claim 3 wherein said corrugated sheet has show surface areas on the corresponding sides at one side of their crests, and shade surface areas on the corresponding sides at the other side of their crests, said areas being arranged so that the unit can be positioned to expose the show areas directly to radiations from a predetermined source, and, when so positioned, the shown areas are disposed between said source and the shade areas; and
said shade areas have greater radiation transmission capabilities than the show areas.

10. The structural unit according to claim 9 wherein the show areas are coated with material which imparts to them a higher degree of light reflectivity than that of the shade areas.

11. The structural unit according to claim 9 wherein the corrugated sheet is radiochromic.

12. The structural unit according to claim 3 wherein the constraining means include means which engage said pair of sheets at their peripheries and hold their peripheries in fixed relation to each other.

13. The structural unit according to claim 12 wherein said sheets and constraining means are such that each space between each two adjacent crests at the same face of the corrugated sheet and associated one of said pair of sheets at said face is isolated, throughout its entire boundary from the other like spaces at said face and from like spaces between the opposite face of the corrugated sheet and the other of said pair of sheets.

14. The structural unit according to claim 3 wherein the corrugated sheet is a combined light reflector and light transmitter, and has low heat conductive properties.

15. The structural unit according to claim 3 wherein said sheets of said pair are parallel to each other, and one side of each of the triangles extends substantially 90° to said pair of sheets.

16. The structural unit according to claim 15 wherein said one side of each triangle is clear for passage of light therethrough, and at least a portion of the hypotenuse of the same triangle is a show area which impedes the passage of light therethrough.

* * * * *

UNITED STATES PATENT AND TRADEMARK OFFICE
CERTIFICATE OF CORRECTION

PATENT NO. : 4,035,539
DATED : July 12, 1977
INVENTOR(S) : Sergius N. Ferris Luboshez It is certified that error appears in the above-identified patent and that said Letters Patent are hereby corrected as shown below:

```
Col. 1, line 39, after "They have" read --high--;
Col. 5, line 35, for "securd" read -- secured--;
Col. 7, line 21, for "sum" read --sun--.
```

Signed and Sealed this

Eighth Day of November 1977

[SEAL]

Attest:

RUTH C. MASON
*Attesting Officer*

LUTRELLE F. PARKER
*Acting Commissioner of Patents and Trademarks*